US010094157B2

(12) United States Patent
Pyo

(10) Patent No.: US 10,094,157 B2
(45) Date of Patent: Oct. 9, 2018

(54) VARIABLE SHOCK-ABSORBING DAMPER FOR FURNITURE HINGE, WITH BUILT-IN PRESSURE CONTROL MEANS

(71) Applicant: SAMSUNG PRECISION IND. CO., LTD, Incheon (KR)

(72) Inventor: Chul Soo Pyo, Gyeonggi-do (KR)

(73) Assignee: SAMSUNG PRECISION IND. CO., LTD, Incheon (KR)

( * ) Notice: Subject to any disclaimer, the term of this patent is extended or adjusted under 35 U.S.C. 154(b) by 0 days.

(21) Appl. No.: 15/124,113

(22) PCT Filed: Jun. 26, 2014

(86) PCT No.: PCT/KR2014/005707
§ 371 (c)(1),
(2) Date: Sep. 7, 2016

(87) PCT Pub. No.: WO2015/137567
PCT Pub. Date: Sep. 17, 2015

(65) Prior Publication Data
US 2017/0016260 A1 Jan. 19, 2017

(30) Foreign Application Priority Data
Mar. 12, 2014 (KR) .................. 10-2014-0029058

(51) Int. Cl.
*F16F 9/516* (2006.01)
*E05F 3/00* (2006.01)
(Continued)

(52) U.S. Cl.
CPC .................. *E05F 3/00* (2013.01); *F16F 9/19* (2013.01); *F16F 9/3415* (2013.01); *F16F 9/512* (2013.01);
(Continued)

(58) Field of Classification Search
CPC ...... F16F 9/0218; F16F 9/0227; F16F 9/0281; F16F 9/02; F16F 9/19; F16F 9/3214;
(Continued)

(56) References Cited

U.S. PATENT DOCUMENTS 4,156,523 A * 5/1979 Bauer .................. F16F 9/0227
267/120
4,433,759 A * 2/1984 Ichinose ................ E05C 17/30
16/51
(Continued)

FOREIGN PATENT DOCUMENTS

JP 2010-151301 A 7/2010
KR 10-2009-0025744 A 3/2009
(Continued)

OTHER PUBLICATIONS

International Search Report dated Sep. 29, 2014 in corresponding Application No. PCT/KR2014/005707; 2 pgs.
(Continued)

*Primary Examiner* — Bradley T King
*Assistant Examiner* — Stephen M Bowes
(74) *Attorney, Agent, or Firm* — Maier & Maier, PLLC

(57) ABSTRACT

A shock-absorbing damper for absorbing the impact force generated during the opening/closing of a furniture door, the damper including: a load pin in a housing to move back and forth during the opening/closing of the furniture door; a main valve coupled to the load pin to form a first flow path; a check valve coupled to a guide bar of the main valve in a manner to form a second flow path; a guider coupled to the main valve to guide the fluid flow; and a pressure adjuster interposed between the main valve and the check valve to vary the first flow path. The pressure adjuster and the guider are provided in the shock-absorbing damper to vary a flow path corresponding to an opening/closing load of the furni-
(Continued)

(a)

(b)

ture door, thereby opening/closing the furniture door at a set speed regardless of the size or weight.

1 Claim, 4 Drawing Sheets

(51) Int. Cl.
*F16F 9/34* (2006.01)
*F16F 9/512* (2006.01)
*F16F 9/19* (2006.01)
*E05F 5/00* (2017.01)
*A47B 96/00* (2006.01)

(52) U.S. Cl.
CPC ............... *A47B 96/00* (2013.01); *E05F 5/006* (2013.01); *E05Y 2201/21* (2013.01); *E05Y 2201/254* (2013.01); *E05Y 2201/264* (2013.01)

(58) Field of Classification Search
CPC .......... F16F 9/34; F16F 9/3405; F16F 9/3415; F16F 9/512; F16F 9/5165; F16F 9/5126; F16F 9/516
See application file for complete search history.

(56) References Cited

U.S. PATENT DOCUMENTS

| | | | |
|---|---|---|---|
| 4,561,641 A * | 12/1985 | DeYoung | B60G 11/265 188/268 |
| 5,277,283 A * | 1/1994 | Yamaoka | F16F 9/468 188/266.4 |
| 2011/0127129 A1* | 6/2011 | Okabayashi | F16F 9/3415 188/282.1 |
| 2015/0197972 A1* | 7/2015 | Chang | E05F 3/12 188/313 |

FOREIGN PATENT DOCUMENTS

KR  10-2010-0072882 A  7/2010
KR  10-1290252 B1  7/2013

OTHER PUBLICATIONS

Notice of Allowance dated Apr. 29, 2014 issued in corresponding KR 10-2014-0029058; 3 pgs.

* cited by examiner

[Fig. 1] PRIOR ART
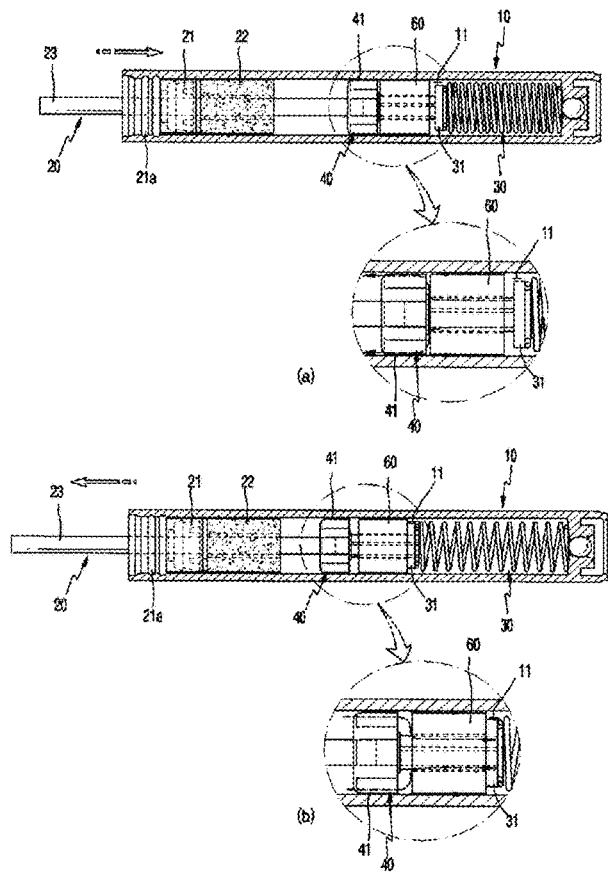
[Fig. 2]
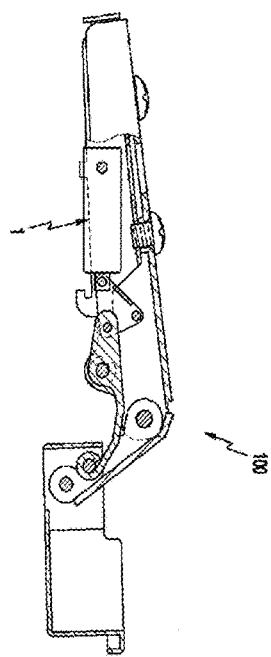

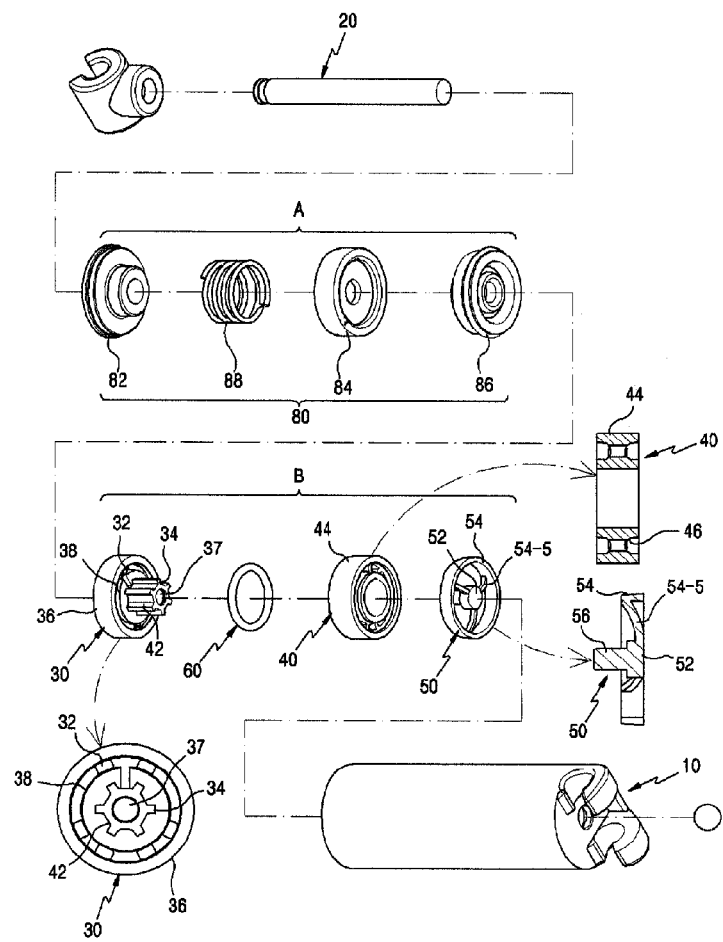
[Fig. 3]

[Fig. 4]
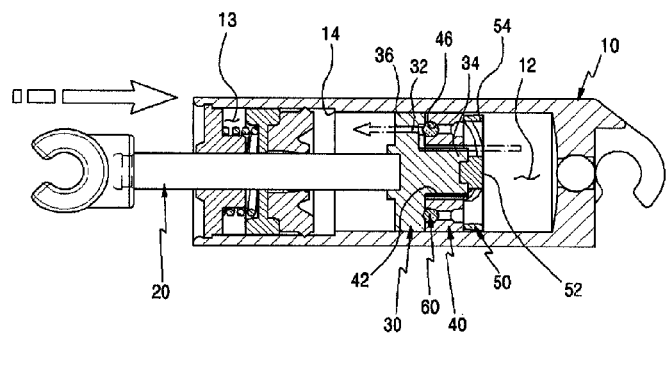
(a)
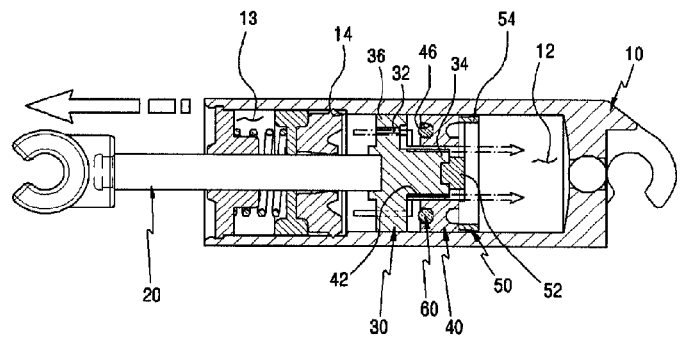
(b)

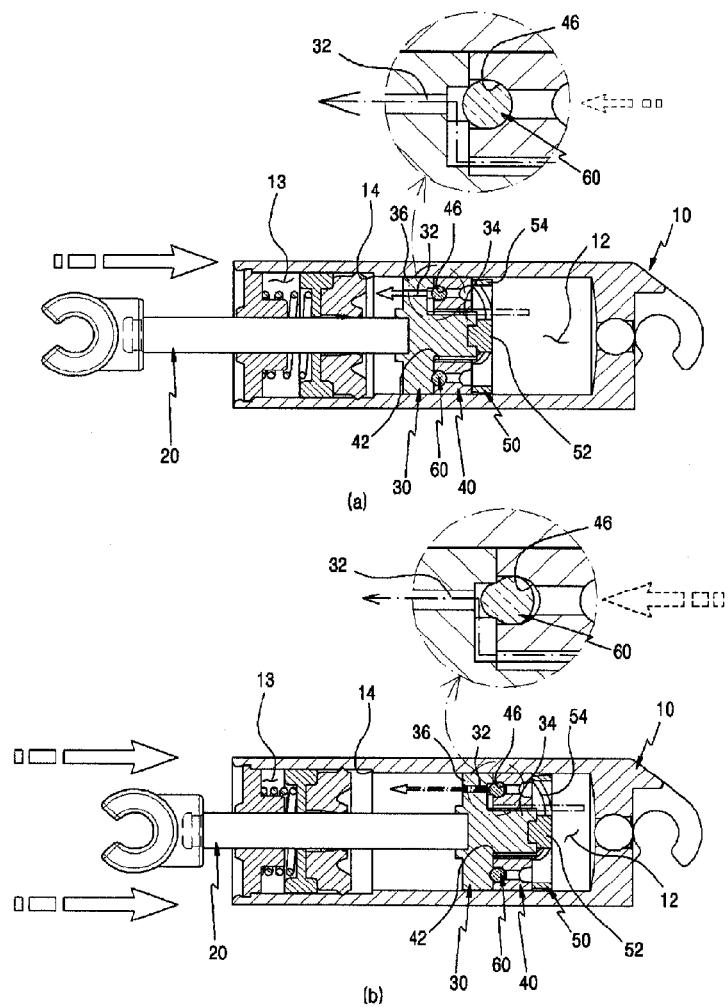
[Fig. 5]

VARIABLE SHOCK-ABSORBING DAMPER FOR FURNITURE HINGE, WITH BUILT-IN PRESSURE CONTROL MEANS

TECHNICAL FIELD

The present invention relates to a shock-absorbing damper that absorbs an impact force generated in the process of opening and closing a door of a piece of furniture (hereinafter, referred to as "furniture door") to buffer the shock, and more particularly, to a variable shock-absorbing damper for a furniture hinge, which has a pressure adjustment means built therein, wherein the pressure adjustment means with a simple structure is built in the shock-absorbing damper so that the opening and closing speed of the furniture door can always be maintained uniformly irrespective of the size or weight of the furniture door.

BACKGROUND ART

In general, a furniture hinge is a structure which is mounted on a piece of furniture piece such as a sink or a closet and is used as a means for opening and closing a furniture door. The furniture hinge serves to absorb an external load occurring in the process of opening and closing the furniture door to minimize a noise. In addition, the furniture hinge has a built-in shock-absorbing damper as a means for extending the lifespan of the furniture.

Herein, the shock-absorbing damper mainly employs a method of absorbing an opening and closing load of the furniture door through the interaction of various built-in components including a valve that controls the flow rate of a working fluid while being reciprocated by a piston and a check valve that controls the flow rate of the working fluid while being reciprocated by the valve.

For example, as shown in FIG. 1, the present applicant has proposed a shock-absorbing damper (Korean Patent No. 10-0760518) as a technology that consists of a cylinder, a piston 20 supported by a spring 30 accommodated in the cylinder, a valve 40 that is reciprocated by the piston 20, and a check valve 60 that is coupled to a projection of the valve 40.

In this case, as shown in FIG. 1(a), when a pressure is applied to the piston 20, the working fluid within the cylinder moves by an amount corresponding to the amount of compression of the valve 40 in an arrow direction on the drawing sheet via a flow path or a gap 41 so that the check valve 60 moves along the outer circumference of the projection of the valve 40 to control the pressure of the fluid.

On the other hand, as shown in FIG. 1(b), when the pressure applied to the piston 20 is released, the working fluid within the cylinder moves by an amount corresponding to the amount of returning of the valve 40 in an arrow direction on the drawing sheet via the flow path or a gap so that the check valve 60 returns to its original position along the outer circumference of the projection of the valve 40 to control the pressure of the fluid.

However, the shock-absorbing damper is configured in such a manner that the check valve 60 reciprocates by an amount corresponding to the amount of movement of the piston 20. Thus, in the case where a strong or weak external force is applied to the piston 20, the flowing speed of the working fluid cannot be controlled only by the check valve 60.

In particular, in the process of manufacturing the shock-absorbing damper, a method is used in which the number or weight of the check valve 60 is adjusted to control the flowing speed of the working fluid, but it is substantially impossible to separately adjust the number or weight of the check valve 60 to fit the size or weight of the furniture door, thus making it difficult to realize the diffusion of shock-absorbing damper.

In addition, in the process of manufacturing the shock-absorbing damper, a method is used in which the number or size of the flow path or the gap 41 is adjusted to control the flowing speed of the working fluid, but it is substantially impossible to separately adjust the number or size of the flow path or the gap 41 to fit the size or weight of the furniture door, thus making it difficult to realize the diffusion of shock-absorbing damper.

Therefore, there is an urgent need for research on a device in which the piston 20 is always operated at a uniform speed irrespective of the size or weight of the furniture door in a state in which the number or weight of the check valve 60 accommodated in the shock-absorbing damper as well as the number of size of the flow path or the gap 41 are not changed.

RELATED ART DOCUMENTS

Patent Document

Patent Document 1: Korean Patent No. 10-0760518 (Issue date: Sep. 14, 2007)

DISCLOSURE OF INVENTION

Technical Problem

Accordingly, the present invention has been made to solve the above-mentioned problems occurring in the prior art, and it is an object of the present invention to provide a variable shock-absorbing damper for a furniture hinge, which has a pressure adjustment means built therein, wherein the pressure adjustment means with a simple structure is built in the shock-absorbing damper so that the opening and closing speed of the furniture door can always be maintained uniformly irrespective of the size or weight of the furniture door.

Technical Solution

To achieve the above objects, the present invention provides a variable shock-absorbing damper for a furniture hinge, which includes a pressure adjustment means built in the furniture hinge to buffer and absorb an external load occurring in the process of opening and closing a furniture door, the damper including: a housing configured to have accommodated therein working fluid of the shock-absorbing damper; a load pin fittingly coupled to the housing and configured to reciprocate in the process of opening and closing the furniture door; a main valve coupled to the load pin and including a first flow path defined therein; a check valve slidably coupled to a guide bar of the main valve so as to allow a second flow path to be defined between the guide bar and the check valve; a guider configured to expanded or returned to its original position by a pressure of the working fluid while being coupled to the main valve to guide a fluid flow; and a pressure adjuster interposed between the main valve and the check valve and configured to be deformed according to the pressure of the fluid to control a flow amount of the first flow path or the second flow path.

Advantageous Effects

The variable shock-absorbing damper for a furniture hinge according to the present invention has the following advantageous effects.

First, the shock-absorbing damper includes the pressure adjuster and the guider, which are built therein, and the flow path is varied to fit the opening and closing load of the furniture door so that the furniture door can always be opened and closed at a set speed irrespective of the size or weight of the furniture door.

Second, the opening and closing speed of the furniture door is always controlled at the set speed by the pressure adjuster so that a contact noise or resistance occurring in the opening and closing process of the furniture door can be minimized, thus leading to an extension of the lifespan of the damper and an increase in the operation reliability of the damper.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a cross-sectional view illustrating a state in which a shock-absorbing damper according to the prior art is compressed and released;

FIG. 2 is an exploded perspective view illustrating a state in which a shock-absorbing damper according to the present invention is installed;

FIG. 3 is an exploded perspective view illustrating a shock-absorbing damper according to the present invention;

FIG. 4 is a cross-sectional view illustrating a state in which a shock-absorbing damper according to the present invention is compressed and released; and FIG. 5 is an exploded perspective view illustrating a state in which a primary pressure and a secondary pressure of a shock-absorbing damper according to the present invention are applied.

*Explanation on reference numerals of main elements in the drawings*

| | | | |
|---|---|---|---|
| 10: | housing | 12, 13: | first and second hollow parts |
| 14: | stepped part | 20: | load pin |
| 30: | main valve | 32: | first flow path |
| 34: | guide bar | 36: | head |
| 37: | coupling hole | 38: | semi-circular groove |
| 40: | check valve | 42: | second flow path |
| 44: | body | 46: | semi-circular groove |
| 50: | guider | 52: | body |
| 54: | skirt | 60: | pressure adjuster |
| 82: | end cap | 84: | seal plate |
| 86: | seal | 88: | spring |

BEST MODE FOR CARRYING OUT THE INVENTION

Now, a preferred embodiment of a shock-absorbing damper according to the present invention will be described hereinafter in detail with reference to the accompanying drawings.

As shown in FIGS. 2 to 5, the shock-absorbing damper of the present invention includes a housing 10 configured to have accommodated therein working fluid of the shock-absorbing damper 1; a load pin 20 fittingly coupled to the housing 10 and configured to reciprocate in the process of opening and closing the furniture door; a main valve 30 coupled to an end of the load pin 20 and including a first flow path 32 defined therein; a check valve 40 slidably coupled to a guide bar 34 of the main valve 30 so as to allow a second flow path 42 to be defined between the guide bar 34 and the check valve 40; a guider 50 configured to expanded or returned to its original position by a pressure of the working fluid while being coupled to the main valve to guide a fluid flow; and a pressure adjuster 60 interposed between the main valve 30 and the check valve 40 and configured to be deformed according to the pressure of the fluid to control a flow amount of the first flow path 32 or the second flow path 42.

Herein, the shock-absorbing damper 1 according to the present invention serves to absorb a load occurring in the process of opening and closing the furniture door in a state of being built in the furniture hinge 100. The shock-absorbing damper 1 is characterized in that the first and second flow paths 32 and 42 are varied to fit the load of the furniture door so that the opening and closing speed of the furniture door can be always maintained uniformly.

In addition, the housing 10 serves to support the entire load of the shock-absorbing damper 1. The housing 10 includes a first hollow part 12 that accommodates the working fluid therein and a second hollow part 13 that accommodates the load pin 20 therein. The first hollow part 12 and the second hollow part 13 are divided by a stepped part 14.

In this case, the second hollow part 13 accommodates an elastic means A which will be described later, and the first hollow part 12 accommodates a buffer means B which will be described later.

Further, the elastic means A serves to elastically support the load pin 20 and includes an end cap 82 accommodated in the second hollow part 13 and a seal 86 that prevents leakage of the working fluid. A spring 88 is interposed between the end cap 82 and the seal 86 so that the end cap 82 and the seal 86 are maintained elastically.

In this case, the seal 86 is supported by the seal plate 84, particularly is retracted to the left on the drawing sheet by an amount corresponding to the amount of insertion of the load pin 20.

In addition, the buffer means B serves to absorb a load applied to the load pin 20 to perform a buffer function. The buffer means B includes the main valve 30 that is mounted at a front end of the load pint 20 to reciprocate, the check valve 40 that is operated during the reciprocating motion of the main valve 30, the guider 50, and the pressure adjuster 60.

Besides, the load pin 20 serves to support by the elastic means A and the buffer means B in a state of being inserted into the second hollow part 13 of the housing 10. The load pin 20 is configured such that it is compressed in the process of closing the furniture door as shown in FIG. 4(a) or released in the process of opening the furniture door as shown in FIG. 4(b).

In addition, the main valve 30 is coupled to the front end of the load pin 20 to reciprocate together with the load pin 20. The main valve 30 includes a head 36 brought into close contact with the inner wall surface, a plurality of first flow paths 32 formed in the head 36, and a guide bar 34 integrally formed on a side of the head 36.

Further, the main valve 30 has a plurality of semi-circular grooves 38 concavely formed at positions where the first flow paths 32 are defined so as to partly accommodate a body of the pressure adjuster 60.

In addition, a plurality of second flow paths 42 is defined on the outer circumference surface of the guide bar 34, preferably between the outer circumference surface of the guide bar 34 and the inner circumferential surface of the check vale 40.

Further, the check valve 40 is slidably coupled to the guide bar 34 to reciprocate. The check valve 40 includes a body 44 coupled to the outer circumference surface of the guide bar 34 to define the second flow paths 42 and a semi-circular groove 46 concavely formed on a side surface of the body 44 so as to partly accommodate a body of the pressure adjuster 60.

Of course, the check valve 40 has an insertion hole formed at the center thereof, the insertion hole having a size corresponding to an outer diameter of the guide bar 34.

In this case, the semi-circular groove 46 is formed at a position confronting the first flow path 32. In particular, the semi-circular groove 46 is formed in a shape corresponding to that of the semi-circular groove 38 of the main valve 30.

In addition, the guider 50 is coupled to the main valve 30 to reciprocate together with the main valve 30. The guider 50 includes a body 52 coupled to a coupling hole 37 of the main valve 30 by means of a fitting protrusion 56 and a skirt 54 made of a flexible material and integrally formed on the outer circumferential surface of the body 52 through a connection member 54-5 so that the skirt 54 is expanded or returned to its original position according to the pressure of the fluid.

Moreover, the pressure adjuster 60 is inserted between the main valve 30 and the check valve 40, preferably is fittingly inserted into the semi-circular grooves 38 and 46. The pressure adjuster 60 is deformed in shape to fit the pressure of the working fluid in a state of being accommodated in the semi-circular grooves 38 and 46 to perform a function of varying the first flow path 32.

Of course, the pressure adjuster 60 is preferably formed in a cylindrical shape so as to be brought into close contact with the first flow path 32.

In addition, the pressure adjuster 60 is preferably formed of a flexible material so as to increase the efficiency according to the variation of the first flow path 32.

Hereinafter, the operation according to the present invention will be described.

First, as shown in FIG. 4(a), when a pressure is applied to the load pint 20, the working fluid of the first hollow part 12 is moved in an arrow direction, i.e., to the left on the drawing sheet via the guider 50, and thus the buffer means B is operated to fit the pressure of the fluid.

In other words, the working fluid contained in the hosing 10 is moved in the arrow direction on the drawing sheet via the second flow path 42 that defines a gap between the check valve 40 and the guide bar 34 and the first flow path 32 of the main valve 30.

At this time, the check valve 40 is brought into close contact with the main valve 30. For this reason, the pressure adjuster 60 is brought into close contact with the first flow path 32, and thus the load pin 20 is compressed at a set speed to fit pressure of the working fluid.

On the other hand, as shown in FIG. 4(b), when the pressure applied to the load pin 20 is released, the working fluid of the first hollow part 12 is moved in an arrow direction, i.e., to the right on the drawing sheet via the first flow path 32 and the second flow path 42.

In other words, the check valve 40 brought into close contact with the main valve 30 is separated from the main valve 30, and simultaneously the pressure adjuster 60 brought into close contact with the first flow path 32 is separated from the first flow path 32. Thus, the load pin 20 returns to its original position at a set speed.

Further, in the returning process of the load pin 20, the skirt 54 of the guider 50 is expanded by the working fluid returning through the first and second flow paths 32 and 42. Thus, the working fluid returns at the set speed.

Meanwhile, although a pressure of more than a prescribed value is applied to the load pin 20, the pressure adjuster 60 is deformed as shown in FIG. 5(b) so that the first flow path 32 is varied and thus the load pin 20 is operated at the set speed.

In other words, the pressure adjuster 60 is deformed by a pressure corresponding to the pressure applied to the load pin 20 to substantially block the first flow path 32 so that although an abnormal pressure is exerted to the furniture door, the closing speed of the furniture door can be constantly maintained.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

The invention claimed is:

1. A variable shock-absorbing damper for a furniture hinge, which includes a pressure adjuster built in the furniture hinge to buffer and absorb an external load occurring in the process of opening and closing a furniture door, the damper comprising:
a housing configured to have accommodated therein a working fluid of the shock-absorbing damper;
a load pin fittingly coupled to the housing and configured to reciprocate in the process of opening and closing the furniture door;
a main valve coupled to the load pin and including a first flow path defined therein;
a check valve slidably coupled to a guide bar of the main valve so as to allow a second flow path to be defined between the guide bar and the check valve, wherein the check valve comprises a semi-circular groove concavely formed in a position facing the first flow path so as to partly accommodate a body of the pressure adjuster;
a guider configured to be deformed or returned by a pressure of the working fluid while being coupled to the main valve to guide a fluid flow; and
a pressure adjuster interposed between the main valve and the check valve and configured to be deformed according to the pressure of the fluid to vary the first flow path, wherein the guider comprises a body coupled to a coupling hole of the main valve by means of a fitting protrusion, and a skirt integrally formed on the outer circumferential surface of the body through a connection member so that the skirt is deformed or returned according to the pressure of the fluid.

* * * * *